US008598263B2

(12) United States Patent
Wu

(10) Patent No.: US 8,598,263 B2
(45) Date of Patent: Dec. 3, 2013

(54) ENDLESS FLEXIBLE MEMBERS FOR IMAGING DEVICES

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 221 days.

(21) Appl. No.: 13/026,251

(22) Filed: Feb. 13, 2011

(65) Prior Publication Data

US 2012/0208907 A1 Aug. 16, 2012

(51) Int. Cl.
*C08K 3/04* (2006.01)
*C08G 73/10* (2006.01)

(52) U.S. Cl.
USPC ............................ 524/495; 524/496; 524/847

(58) Field of Classification Search
USPC .......................................... 524/495, 496, 847
See application file for complete search history.

(56) References Cited

U.S. PATENT DOCUMENTS

| | | | | |
|---|---|---|---|---|
| 5,978,639 | A * | 11/1999 | Masuda et al. | 399/302 |
| 7,593,676 | B2 | 9/2009 | Katoh | |
| 2007/0025740 | A1 * | 2/2007 | Katoh et al. | 399/1 |

* cited by examiner

*Primary Examiner* — Ling Choi
*Assistant Examiner* — Darcy D Laclair Lynx
(74) *Attorney, Agent, or Firm* — MDIP LLC

(57) ABSTRACT

Flexible members for use in imaging devices comprise a polyamic acid and an internal release agent; and optionally, a polysiloxane surfactant.

9 Claims, No Drawings

ENDLESS FLEXIBLE MEMBERS FOR IMAGING DEVICES

FIELD

A novel flexible member composition, such as, an intermediate transfer belt (ITB), such as, an endless belt having an annular main body, for use in an electrophotographic imaging device is provided. The imaging device produces a fixed toner image on a recording medium.

BACKGROUND

In the electrophotographic imaging arts, an image forming apparatus forms a static latent image by exposure of a surface of a charged photosensitive member to patterns of light, develops that static latent image to form a toner image, and finally transfers the toner image to a recording medium, such as, a paper, at a predetermined transfer position, thereby forming an image thereon.

One such image forming apparatus employs, in the process of image formation and development, an endless belt that is stretched around support rolls, and which circulates and moves as a unit, carrying the formed toner image to a transfer position. Alternatively, the endless belt can operate as a unit that transfers the recording medium to a transfer position.

In an image forming apparatus that forms a color image, because toner images of individual different colors are superimposed on one another, an endless belt can be used as a unit that carries the toner images of different color which are sequentially applied or received in building the final composite color image. An endless belt also can be used as a unit for transferring a recording medium that sequentially receives toner images of different color. See, for example, U.S. Pat. No. 7,677,848 and U.S. Publ. No. 20100279217, herein incorporated by reference in entirety.

Image forming apparatus with high endurance that are capable of withstanding, for example, temperature variation and high volume output, are desirable. Hence, materials to enhance flexible member performance and preparation are desirable.

Endless flexible belts can be made by producing a film on or attached to a mold, mandrel or form. A film-forming solution or composition is applied to a form by, for example, dipping, spraying, flow coating or other known method, and the solution or composition can be dispersed or distributed to form a thin film, for example, by centrifugation over the inner wall of a hollow form, for example, a cylindrical form.

When using such forming or molding methods, the dried or cured film must be separated from the molding form, and preferably with minimal stress, deformation, damage and the like to the film. Moreover, it is desirable that the film be easily removed from the molding form.

In the electrophotographic arts, it is beneficial, if not necessary, for a flexible member surface that carries a charge and a latent image to be regular with minimal imperfections, such as, pits, valleys, indentations, waves, wrinkles, dimples and the like, an erose surface is not beneficial if maximal image fidelity is desired.

SUMMARY

According to aspects disclosed herein, there is provided a film-forming composition for making flexible members for use in electrophotography, such as, a flexible image transfer member, such as, an intermediate transfer belt (ITB), wherein a coating solution for forming same comprises a polyamic acid and an internal release agent that facilitates removal of the formed film from a mold, mandrel, form and the like.

In embodiments, an internal release agent can comprise an ester or ether of a phosphate or a phosphoric acid, and the phosphate or phosphoric acid, which may be derivatized, may be stabilized with a non-aromatic amine, and which further can comprise a sulfur or sulfur-containing moiety.

An embodiment comprises a film-forming composition, such as, a coating solution for making a flexible image transfer member, such as, an intermediate transfer belt (ITB), optionally comprising a polysiloxane surfactant.

Another disclosed embodiment comprises an imaging or printing device comprising a film comprising a polyimide obtained from a polyamic acid composition and an internal release agent, and optionally, a polysiloxane surfactant.

DETAILED DESCRIPTION

As used herein, the term, “electrophotographic,” or grammatic versions thereof, is used interchangeably with the term, “xerographic.” In some embodiments, such as, in the case of forming a color image, often, individual colors of an image are applied sequentially. Thus, a, “partial image,” is one which is composed of one or more colors prior to application of the last of the colors to yield the final or composite color image. “Flexible,” is meant to indicate ready deformability, such as, observed in a belt, web, film and the like, that, for example, are adaptable to operate and for use with, for example, rollers.

For the purposes of the instant application, “about,” is meant to indicate a deviation of no more than 20% of a stated value or a mean value. Other equivalent terms include, “substantial,” and, “essential,” or grammatic forms thereof.

In electrophotographic (xerographic) reproducing or imaging devices, including, for example, a digital copier, an image-on-image copier, a contact electrostatic printing device, a bookmarking device, a facsimile device, a printer, a multifunction device, a scanning device and any other such device, a printed output is provided, whether black and white or color, or a light image of an original is recorded in the form of an electrostatic latent image on an imaging device component, for example, which may be present as an integral component of an imaging device or as a replaceable component or module of an imaging device, and that latent image is rendered visible using electroscopic, finely divided, colored or pigmented particles, or toner. The imaging device component can be a flexible member.

A flexible member can comprise an intermediate transfer member, such as, an intermediate transfer belt (ITB), a fuser belt, a pressure belt, a transfuse belt, a transport belt, a developer belt and the like. Such members can comprise a single layer or plural layers, such as, a support layer and one or more layers of particular function.

Hence, such transfer members can be present in an electrophotographic image forming device or printing device. In the case of an ITB, a photoreceptor is electrostatically charged and then is exposed to a pattern of activating electromagnetic radiation, such as, light, which alters the charge on the surface of an imaging device component leaving behind an electrostatic latent image thereon. The electrostatic latent image then is developed at one or more developing stations to form a visible image or a partial image by depositing finely divided electroscopic colored, dyed or pigmented particles, or toner, for example, from a developer composition, on the surface of the imaging component. The resulting visible image on the photoreceptor is transferred to an ITB for transfer to a receiving member or for further developing of the image, such as, building additional colors on successive partial images. The final image then is transferred to a receiving member, such as, a paper, a cloth, a polymer, a plastic, a metal and so on, which can be presented in any of a variety of forms, such as, a flat surface, a sheet or a curved surface. The transferred particles are fixed or fused to the receiving member by any of a variety of means, such as, by exposure to elevated temperature and/or elevated pressure.

An intermediate transfer member also finds use in color systems and other multi-imaging systems. In a multi-imaging system, more than one image is developed, that is, a series of partial images. Each image is formed on the photoreceptor, is developed at individual stations and is transferred to an intermediate transfer member. Each of the images may be formed on the photoreceptor, developed sequentially and then transferred to the intermediate transfer member or each image may be formed on the photoreceptor developed and transferred in register to the intermediate transfer member. See, for example, U.S. Pat. Nos. 5,409,557; 5,119,140; and 5,099,286, the contents of which are incorporated herein by reference in entirety.

It can be desirable to minimize transferring developer or developer carrier to the receiving member, that is, for example, a paper. Therefore, it can be advantageous to transfer the developed image on a photoreceptor to an intermediate transfer web, belt, roll or member, and subsequently to transfer the developed image from the intermediate transfer member to a permanent or ultimate substrate or receiving member.

To obtain quality image transfer, that is, to minimize image shear, the displacement of a transfer member due to disturbance during transfer member driving can be reduced by limiting the thickness of the support or substrate, for example, to about 50 μm. Thus, the thickness of the substrate or support can be from about 50 μm to about 150 μm or from 70 μm to about 100 μm.

In the instant disclosure, a substrate of interest is a polyimide that is obtained from a polyamic acid derivative of a carboxylate reagent, such as, a polycarboxylate reagent that on reaction, drying and/or curing, forms a polyimide suitable for use as a flexible member in an imaging device.

Polyamic acid derivatives are available commercially, for example, U-VARNISH-A or U-VARNISH-S (UBE America Inc.) and a Pyre-ML®, such as, RC-5019 or 5083 (Industrial Summit Technology Co.), or can be made practicing methods known in the art, see, for example, U.S. Pat. No. 7,812,084.

When synthesizing a polyamic acid, suitable carboxylates are those comprising plural carboxyl groups for reacting with a polyamine in a polar solvent.

Suitable aromatic polycarboxylates include, a mellitic acid, such as, pyromellitic acid (BEYO Chemical Co., Ltd.), 3,3',4,4'-benzophenonetetracarboxylic acid, 3,3',4,4'-biphenylsulfonetetracarboxylic acid, 1,4,5,8-naphthalenetetracarboxylic acid, 2,3,6,7-naphthalenetetracarboxylic acid, 3,3',4,4'-biphenylethertetracarboxylic acid, 3,3',4,4'-dimethyldiphenylsilanetetracarboxylic acid, 3,3',4,4'-tetraphenylsilanetetracarboxylic acid, 1,2,3,4-furantetracarboxylic acid, 4,4'-bis(3,4-dicarboxyphenoxy) diphenylsulfide, 4,4'-bis(3,4-dicarboxyphenoxy) diphenylsulfone, 4,4'-bis(3,4-dicarboxyphenoxy) diphenylpropane, 3,3',4,4'-perfluoroisopropylidenediphthalic acid, 3,3',4,4'-biphenyl tetracarboxylic acid, bis(phthalic acid) phenylphosphine oxide, p-phenylene-bis(triphenylphthalic acid), m-phenylene-bis(triphenylphthalic acid), bis(triphenylphthalic acid)-4,4'-diphenylether, bis(triphenylphthalic acid)-4,4'-diphenylmethane and the like.

Examples of an aliphatic polycarboxylates include aliphatic or alicyclic tetracarboxylic acids, such as, butanetetracarboxylic acid, 1,2,3,4-cyclobutanetetracarboxylic acid, 1,3-dimethyl-1,2,3,4-cyclobutanetetracarboxylic acid, 1,2,3,4-cyclopentanetetracarboxylic acid, 2,3,5-tricarboxycyclopentylacetic acid, 3,5,6-tricarboxynorbornane-2-acetic acid, 2,3,4,5-tetrahydrofurantetracarboxylic acid, 5-(2,5-dioxotetrahydro furanyl)-3-methyl-3-cyclohexene-1,2-dicarboxylic acid, and bicyclo[2,2,2]-oct-7-ene-2,3,5,6-tetracarboxylic acid; an aromatic ring-containing aliphatic tetracarboxylic acid, and the like.

Suitable examples of a polyamine include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene) bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl, 4,4'-oxydianiline, aromatic diamines having two amino groups bound to an aromatic ring and a heteroatom other than the nitrogen atoms of the amino groups, such as, diaminotetraphenylthiophene; aliphatic diamine and alicyclic diamines such as 1,1-m-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,02.7]-undecylenedimethyldiamine, 4,4'-methylenebis (cyclohexylamine); and the like.

Examples of polar organic solvents that can be used for preparing a polyamic acid of interest include sulfoxide solvents, such as, dimethylsulfoxide and diethylsulfoxide, formamide solvents, such as, N,N-dimethylformamide and N,N-diethylformamide, acetamide solvents, such as, N,N-dimethylacetamide and N,N-diethylacetamide, pyrrolidone solvents, such as, N-methyl-2-pyrrolidone and N-vinyl-2-pyrrolidone, phenol-based solvents, such as, phenol, o-cresol, m-cresol, p-cresol, xylenol, halogenated phenols and catechol, ether solvents, such as, tetrahydrofuran, dioxane and dioxolane, alcohol solvents, such as, methanol, ethanol and butanol, cellosolve solvents, such as, butyl cellosolve, hexamethylphosphoramide, γ-butylolactone, and the like. The solvent may be used alone or in combination of two or more.

The reaction temperature during polymerization of a polyamic acid can be in the range of from about 0° C. to about 80° C.

The film-forming composition comprising a polyamic acid derivative comprises an internal release agent, such as, a non-aromatic amine-neutralized phosphate, an amine-neutralized phosphoric acid ester, an amine-neutralized phosphate or phosphoric acid containing a sulfur or a sulfur-containing moiety and so on. Examples of suitable commercially available lubricants include a VANLUBE®, such as 672 or 9123 (R.T. Vanderbilt Co., Inc.) and an ADDITIN®, such as, RC3740, RC3760 or RC3775 (Rhein Chemie Corp.).

The internal releasing agent can be present in the film-forming composition in an amount of from about 0.1 wt % to about 5 wt %, from about 0.5 wt % to about 3 wt %, from about 0.8 wt % to about 2 wt %, or about 1 wt %.

The film-forming composition comprising a polyamic acid derivative optionally can comprise a polysiloxane surfactant to enhance surface uniformity, smoothness and so on. Suitable examples include polyether and/or polyester modified polydimethylsiloxanes, which can be hydroxylated, or silicone modified polyacrylates. Examples of commercially available silicone surfactants include a BYK® additive, such as, 310, 330 and 375, and BYK®-SILCLEAN 3700.

The polysiloxane surfactant can be present in the film-forming composition in an amount of from about 0.05 wt % to about 2 wt %, from about 0.01 wt % to about 1 wt %, from about 0.02 wt % to about 0.5 wt %, or about 0.3 wt %.

A transfer member or device generally is one where the surface destined to carry an image has a low surface energy, i.e., material comprising an electrically conducting agent dispersed thereon having a contact angle of not less than about 70° or at least about 70° with respect to a water droplet as represented by wettability by water. The term, "wettability by water," as used herein is meant to indicate the angle of contact of a material constituting the surface layer as a specimen with respect to a water droplet.

Electrical property regulating materials can be added to the substrate or to a layer superficial thereto to regulate electrical properties, such as, surface and bulk resistivity, dielectric constant and charge dissipation. In general, electrical property regulating materials can be selected based on the desired resistivity of the film. High volume fractions or loadings of the electrical property regulating materials can be used so that the number of conductive pathways is always well above the percolation threshold, thereby avoiding extreme variations in resistivity. The percolation threshold of a composition is a volume concentration of dispersed phase below which there is so little particle to particle contact that the connected regions are small. At higher concentrations than the percolation threshold, the connected regions are large enough to traverse the volume of the film, see, for example, Scher et al., J Chem Phys, 53(9)3759-3761, 1970, who discuss the effects of density in percolation processes.

Particle shape of the electrical property regulating material can influence volume loading. Volume loading can depend on whether the particles are, for example, spherical, round, irregular, spheroidal, spongy, angular or in the form of flakes or leaves. Particles having a high aspect ratio do not require as high a loading as particles having a relatively lower aspect ratio. Particles which have relatively high aspect ratios include flakes and leaves. Particles which have a relatively lower aspect ratio are spherical and round particles.

The percolation threshold is practically within a range of a few volume % depending on the aspect ratio of the loadent. For any particular particle resistivity, the resistivity of the coated film can be varied over about one order of magnitude by changing the volume fraction of the resistive particles in the layer. The variation in volume loading enables fine tuning of resistivity.

The resistivity varies approximately linearly to the bulk resistivity of the individual particles and the volume fraction of the particles in the support or layer. The two parameters can be selected independently. For any particular particle resistivity, the resistivity of the reinforcing member can be varied over roughly an order of magnitude by changing the volume fraction of the particles. The bulk resistivity of the particles preferably is chosen to be up to three orders of magnitude lower than the bulk resistivity desired in the member. When the particles are mixed with the support or layer in an amount above the percolation threshold, the resistivity of the resulting reinforcing member can decrease in a manner proportional to the increased loading. Fine tuning of the final resistivity may be controlled on the basis of that proportional increase in resistivity.

The bulk resistivity of a material is an intrinsic property of the material and can be determined from a sample of uniform cross section. The bulk resistivity is the resistance of such a sample multiplied by the cross sectional area divided by the length of the sample. The bulk resistivity can vary somewhat with the applied voltage.

The surface or sheet resistivity (expressed as ohms/square, Ω/□) is not an intrinsic property of a material because that metric depends on material thickness and contamination of the material surface, for example, with condensed moisture. When surface effects are negligible and bulk resistivity is isotropic, the surface resistivity is the bulk resistivity divided by the reinforcing member thickness. The surface resistivity of a film can be measured without knowing the film thickness by measuring the resistance between two parallel contacts placed on the film surface. When measuring surface resistivity using parallel contacts, one uses contact lengths several times longer than the contact gap so that end effects do not cause significant error. The surface resistivity is the measured resistance multiplied by the contact length to gap ratio.

Particles can be chosen which have a bulk resistivity slightly lower than the desired bulk resistivity of the resulting member. The electrical property regulating materials include, but are not limited to pigments, quaternary ammonium salts, carbons, dyes, conductive polymers and the like. An example of a carbon black is Special Black 4 (Evonik Industries). Electrical property regulating materials may be added in amounts ranging from about 1% by weight to about 50% by weight of the total weight of the support or layer or from about 5% to about 25% by weight of the total weight of the support or layer.

Thus, for example, carbon black systems can be used to make a layer or layers conductive. That can be accomplished by using more than one variety of carbon black, that is, carbon blacks with different, for example, particle geometry, resistivity, chemistry, surface area and/or size. Also, one variety of carbon black or more than one variety of carbon black can be used along with other non-carbon black conductive fillers.

An example of using more than one variety of carbon black, each having at least one different characteristic from the other carbon black, includes mixing a structured black, such as, VULCAN® XC72, having a steep resistivity slope, with a low structure carbon black, such as, REGAL 250R®, having lower resistivity at increased filler loadings. The desired state is a combination of the two varieties of carbon black which yields a balanced controlled conductivity at relatively low levels of filler loading, which can improve mechanical properties.

Another example of mixing carbon blacks comprises a carbon black or graphite having a particle shape of a sphere, flake, platelet, fiber, whisker or rectangle used in combination with a carbon black or graphite with a different particle shape, to obtain good filler packing and thus, good conductivity. For example, a carbon black or graphite having a spherical shape can be used with a carbon black or graphite having a platelet shape. The ratio of carbon black or graphite fibers to spheres can be about 3:1.

Similarly, by use of relatively small particle size carbon blacks or graphites with relatively large particle size carbon blacks or graphite, the smaller particles can orient in the packing void areas of the polymer substrate to improve particle contact. As an example, a carbon black having a relatively large particle size of from about 1 μm to about 100 μm or from about 5 μm to about 10 μm can be used with a carbon black having a particle size of from about 0.1 μm to about 1 μm or from about 0.05 μm to about 0.1 μm.

In another embodiment, a mixture of carbon black can comprise a first carbon black having a BET surface area of from about 30 $m^2/g$ to about 700 $m^2/g$ and a second carbon black having a BET surface area of from about 150 $m^2/g$ to about 650 $m^2/g$.

Also, combinations of resistivity can be used to yield a shallow resistivity change with filler loading. For example, a carbon black or other filler having a resistivity of about $10^{-1}$ to about $10^3$ ohms-cm, or about $10^{-1}$ to about $10^2$ ohms-cm can be used in combination with a carbon black or other filler having a resistivity of from about $10^3$ to about $10^7$ ohms-cm.

In preparing a polyimide endless belt for an image-forming apparatus by using a polyamic acid composition of the disclosure, the amount of carbon black can be in the range of about 0 to about 20 parts by weight, or about 5 to about 10 parts by weight, with respect to 100 parts by weight of the polyamic acid in the polyamic acid firm-forming composition.

Other fillers, in addition to carbon blacks, can be added to the polymer, resin or film-forming composition and dispersed therein. Suitable fillers include metal oxides, such as, magnesium oxide, tin oxide, zinc oxide, aluminum oxide, zirconium oxide, barium oxide, barium titanate, beryllium oxide, thorium oxide, silicon oxide, titanium dioxide and the like; nitrides such as silicon nitride, boron nitride, and the like; carbides such as titanium carbide, tungsten carbide, boron carbide, silicon carbide, and the like; and composite metal oxides such as zircon ($ZrO_2.Al_2O_3$), spinel ($MgO.Al_2O_3$), mullite ($3Al_2O_3.2SiO_2$), sillimanite ($Al_2O_3.SiO_2$), and the like; mica; and combinations thereof. Optional fillers can be present in the polymer/mixed carbon black coating in an amount of from about 20% to about 75% by weight of total solids, or from about 40% to about 60% by weight of total solids.

The resistivity of the coating layer can be from about $10^7$ to about $10^{13}$Ω/□, from about $10^8$ to about $10^{12}$Ω/□ or from about $10^9$ to about $10^{11}$Ω/□.

In another embodiment, the layer has a dielectric thickness of from about 1 μm to about 10 μm or from about 4 μm to about 7μ.

The hardness of the coating can be less than about 85 Shore A, from about 45 Shore A to about 65 Shore A, or from about 50 Shore A to about 60 Shore A.

In another embodiment, the surface can have a water contact angle of at least about 60°, at least about 75°, at least about 90° or at least about 95°.

Transfer members can be prepared using methods known in the art. The polyamic acid composition is prepared by mixing and dispersing the components in a dispersing machine or a mixing vessel and then the mixture is applied to the form, mandrel or mold, such as, one made from a resin, a glass, a ceramic, stainless steel and so on, for example, using methods such as those described in U.S. Pat. Nos. 4,747,992, 7,593,676 and 4,952,293, which are hereby incorporated herein by reference. Other techniques for applying materials include liquid and dry powder spray coating, dip coating, wire wound rod coating, flow coating fluidized bed coating, powder coating, electrostatic spraying, sonic spraying, blade coating and the like. If a coating is applied by spraying, spraying can be assisted mechanically and/or electrically, such as, by electrostatic spraying.

The film is allowed to dry and/or to cure at a suitable temperature; and then is removed from the mold. As the film of interest is self-releasing, it is not necessary to add a releasing agent, such as, a silicone-based or a fluorine-based composition, to the mold, mandrel or form before applying the film-forming composition thereto or thereon. By, "self-release," is meant that a cured or formed film releases from a mold or form without or with minimal intervention.

In such cases where a film-forming solution or composition is applied to a form, a mandrel, a mold and the like, removal of the formed film intact and with minimal damage, with little difficulty or intervention or both are desirable. The polyamic acid reagent in the solution added directly to the form, mandrel, mold and the like facilitates or enhances such subsequent facile removal of the dried and/or cured film therefrom.

The film can be seamless or can be used to make a seamed member, as known in the art.

Various aspects of the embodiments of interest now will be exemplified in the following non-limiting examples.

EXAMPLES

Example 1

A 14/85.45/0.5/0.05 ratio by weight of Special Black 4 carbon black (Evotik Industries), polyamic acid of pyromellitic acid/4,4-oxydianiline, Pyre-ML RC5019 (Industrial Summit Technology Corp.), VANLUBE 672 (R.T. Vanderbilt Co.) and BYK 310 were dissolved in N-methyl-2-pyrrolidone at a rate of about 13 wt % solids. After ball milling for 120 minutes, the solution was coated on a stainless steel substrate with a 10-mil Bird bar, and dried and cured at 125° C. for 30 minutes, 190° C. for 30 minutes and then at 320° C. for 60 minutes.

The film released readily from the stainless steel mold. The film had a thickness of about 80 μm, had a smooth surface and there was no curl.

Example 2

The ITB of Example 1 was tested for various properties, along with those of a commercially available device, using materials and methods known in the art. The results are provided in the table below.

| | Surface resistivity (ohm/□) | Young's modulus (MPa) | ITB release from metal substrate |
|---|---|---|---|
| The ITB of interest | $4.3 \times 10^{10}$ | 3,300 | Self-releasing |
| Fuji Xerox polyimide/carbon black ITB | $1.6 \times 10^{11}$ | 3,400 | Requires release agent applied to substrate |

The ITB of interest also was tested for thermal expansion as known in the art. The ITB of interest has a CTE of 47 ppm, comparable to that of the Fuji Xerox ITB.

All references cited herein are herein incorporated by reference in entirety.

It will be appreciated that variants of the above-disclosed and other features and functions, or alternatives thereof, may be combined with other and different systems or applications. Various presently unforeseen or unanticipated alternatives, changes, modifications, variations or improvements subsequently may be made by those skilled in the art to and based on the teachings herein without departing from the spirit and scope of the embodiments, and which are intended to be encompassed by the following claims.

What is claimed is:

1. A self-releasing flexible intermediate transfer member comprising a polyamic acid and an amine-neutralized phosphate or phosphoric acid.

2. The self-releasing flexible intermediate transfer member of claim 1, further comprising an electrical property regulating material.

3. The self-releasing flexible intermediate transfer member of claim 1, wherein said phosphate or phosphoric acid is present in an amount by weight of from about 0.1 wt % to about 5 wt %.

4. The self-releasing flexible intermediate transfer member of claim 2, wherein said electrical property regulating material comprises a carbon black.

5. The self-releasing flexible intermediate transfer member of claim 2, wherein said material is present in an amount by weight of from about 5 wt % to about 25 wt %.

6. The self-releasing flexible intermediate transfer member of claim 1, further comprising a polysiloxane surfactant.

7. The self-releasing flexible intermediate transfer member of claim 6, wherein said surfactant is present in an amount from about 0.05% by weight to about 2% by weight.

8. An imaging device comprising the intermediate transfer member of claim 1.

9. An intermediate transfer member produced by the method comprising applying a film-forming solution comprising a polyamic acid and an amine-neutralized phosphate or phosphoric acid to a mold to form said member; and removing said member from said mold, wherein a releasing agent is not used and said member self-releases from said mold.

* * * * *